United States Patent
Injeyan et al.

(10) Patent No.: US 6,268,956 B1
(45) Date of Patent: *Jul. 31, 2001

(54) END PUMPED ZIG-ZAG SLAB LASER GAIN MEDIUM

(75) Inventors: Hagop Injeyan, Glendale; Carolyn S. Hoefer, Malibu; Stephen P. Palese, Torrance, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/580,726

(22) Filed: May 30, 2000

Related U.S. Application Data (63) Continuation-in-part of application No. 09/111,080, filed on Jul. 7, 1998, now Pat. No. 6,094,297.

(51) Int. Cl.⁷ .................................................. H01S 3/00
(52) U.S. Cl. .......................................... 359/345; 359/342
(58) Field of Search ................................. 359/342, 345, 359/333, 349

(56) References Cited

U.S. PATENT DOCUMENTS 3,679,996   7/1972   Almasi et al. .
3,679,999   7/1972   Chernoch .
4,127,827   11/1978  Barry .

(List continued on next page.)

Primary Examiner—Mark Hellner
(74) Attorney, Agent, or Firm—Robert W. Keller (57) ABSTRACT

An optical amplifier (20, 100) includes an elongated slab (22, 102) of solid state lapsing material, such as a rare earth doped yttrium-aluminum-garnet (YAG) slab. In order to provide a relatively increased absorption length and thus a higher overall efficiency, the optical amplifier (20, 100) in accordance with the present invention incorporates end pumping in which the pumped light is coaligned with the amplified light resulting in relatively longer absorption lengths and higher overall efficiencies. The coaligned pumped sources are directed to lateral faces of the slab (22, 102) which include footprints (41, 43, 108) or windows. In order to cause internal reflection of the pump beam along the lapsing axis, the end faces (28, 30, 110) are formed at about a 45° angle relative to the longitudinal axis which causes the pumped light to be reflected within the slab co-axially with amplified light. In order to confine the absorption of the pumped light to the center portion of the slab (22, 102), the slab (22, 102) may be formed from a composite material with the opposing end portions of the slab formed from an undoped host material while the center portion of the slab along the longitudinal axis is formed from a doped host material. Such a configuration provides relatively low residual thermal lensing with virtually no birefringence. In one embodiment, the pumping light from the diode arrays is coupled to the slab (22, 102) by way of lenses (54) or lens ducts (FIG. 1). In an alternate embodiment, the pumping light is coupled to the slab (22, 102) by way of optical fibers (104, 106). In yet another embodiment (FIG. 8), the pumping light and laser beams are interchanged forming a low-loss straight through slab with end pumped architecture.

13 Claims, 5 Drawing Sheets

U.S. PATENT DOCUMENTS

| Patent | Date | Name | Ref |
|---|---|---|---|
| 4,191,931 | 3/1980 | Kuppenheimer . | |
| 4,730,324 | 3/1988 | Azad . | |
| 4,831,333 * | 5/1989 | Welch | 330/4.3 |
| 4,852,109 | 7/1989 | Kuchar . | |
| 4,949,346 | 8/1990 | Kuper et al. . | |
| 4,984,246 | 1/1991 | Cabaret et al. . | |
| 5,008,890 | 4/1991 | McFarlane . | |
| 5,119,382 | 6/1992 | Kennedy . | |
| 5,235,605 | 8/1993 | Rines et al. . | |
| 5,271,031 | 12/1993 | Baer . | |
| 5,285,467 | 2/1994 | Scheps . | |
| 5,305,345 | 4/1994 | Albrecht et al. . | |
| 5,307,430 | 4/1994 | Beach et al. . | |
| 5,317,585 | 5/1994 | Gregor . | |
| 5,351,251 | 9/1994 | Hodgson . | |
| 5,394,420 | 2/1995 | Senn et al. . | |
| 5,408,480 | 4/1995 | Hemmati . | |
| 5,441,803 | 8/1995 | Meissner . | |
| 5,548,606 | 8/1996 | Senn et al. . | |
| 5,555,254 | 9/1996 | Injeyan et al. . | |
| 5,608,742 | 3/1997 | Petersen . | |
| 5,646,773 | 7/1997 | Ingeyan et al. . | |
| 5,651,021 | 7/1997 | Richard et al. . | |
| 5,717,516 * | 2/1998 | Klein et al. | 359/334 |
| 5,717,517 | 2/1998 | Alfano et al. . | |
| 6,052,218 * | 4/2000 | Chandra et al. | 359/333 |
| 6,094,297 * | 7/2000 | Injeyan et al. | 359/345 |

* cited by examiner

Minimum angle defined by TIR from input face, for YAG/air interface minimum α is 29°. This translates to a maximum fiber NA of 0.5

END PUMPED ZIG-ZAG SLAB LASER GAIN MEDIUM

CROSS-REFERENCE TO RELATED APPLICATIONS

This application is a continuation-in-part o patent application Ser. No. 09/111,080, filed on Jul. 7, 1998, now U.S. Pat. No. 6,094,297 entitled "End P damper Zig-Zag Laser Gain Medium", by Hagop Injeyan and Carolyn S. Hoefer and is related to the following commonly owned co-pending application: Ser. No. 09/104,477, now U.S. Pat. No. 6,178,046 filed on Jun. 25, 1998, entitled, "Laser with Two Orthogonal Zig-Zag Gain Media for OPD Compensation", by Injeyan et al.

BACKGROUND OF THE INVENTION

1. Field of the Invention

The present invention relates to an optical amplifier for use, for example, in a high powered solid state laser and more particularly to an optical amplifier which includes an elongated slab of a solid state lapsing material, for example, a rare earth doped yttrium-aluminum-garnet (YAG) crystal and a plurality of diode arrays for exciting the solid state lapsing material to a relatively high energy metastable state, wherein the pumping light is coaligned with the amplified light resulting in relatively long absorption lengths and thus higher overall efficiencies, making the configuration particularly suitable for optical amplifiers which use solid state lapsing materials which have a relatively low absorption length, such as Yb and Tm.

2. Description of the Prior Art

Optical amplifiers are known which include an elongated generally rectangular or square slab of a lapsing material, such as a rare earth doped yttrium-aluminum-garnet (YAG) crystal. The slabs are formed with a generally rectangular or square cross section area defining a pair of opposing end faces and four lateral faces. Material for the slab is selected to have a relatively high index of refraction. The slab is cooled with a cooling medium having a relatively low index of refraction. This change in the index of refraction at the slab coolant interface results in incident light beams directed to one end face of the slab being totally internally reflected through the slab in a zig-zag manner. As such, the optical amplifiers with such a configuration have become known as zig-zag amplifiers. Examples of solid state lasers utilizing such zig-zag amplifiers are disclosed in U.S. Pat. Nos. 4,730,324; 4,852,109 and 5,305,345.

In order to excite the solid state lapsing material to a relatively high energy metastable state, various pumping sources, such as diode arrays are used, for example, as disclosed in U.S. Pat. Nos.: 4,852,109; 4,949,346; 4,984,246; 5,271,031; 5,305,345; 5,317,585 and 5,351,251. In many known optical amplifiers, the pumping sources are configured such that the light from the pumping source is directed along a lateral face of the slab in a direction generally perpendicular to the longitudinal axis of the slab. Examples of optical amplifiers with such a configuration are disclosed in U.S. Pat. Nos.: 4,127,827; 4,852,109; 5,271,031; 5,305,345; 5,646,773 and 5,651,021. Commonly owned U.S. Pat. No. 5,900,967 discloses a configuration where a plurality of diode arrays are directed along the lateral faces of the slab. The system disclosed in '434 application utilizes diode arrays directed generally orthogonal to a longitudinal axis of the slab as well as diode arrays which are directed at an angle relative to the lateral faces to provide a general uniform energy distribution in the slab.

Such configurations, known as side pumped configurations, unfortunately limit the absorption length of the pumping light to just a few millimeters. When such side pump configurations are used with optical amplifiers which use a solid state lapsing material having a relatively low absorption coefficient, such as Yb and Tm doped materials, a relatively low absorption efficiency and, thus a lower overall efficiency results. Thus, there is a need for optical amplifiers capable of relatively longer absorption lengths resulting in relatively higher overall efficiencies.

SUMMARY OF THE INVENTION

Briefly, the present invention relates to an optical amplifier which includes an elongated slab of solid state lapsing material, such as a rare earth doped yttrium-aluminum-garnet garnet (YAG) slab. In order to provide a relatively increased absorption length and thus a higher overall efficiency, the optical amplifier in accordance with the present invention incorporates end pumping in which the pumped light is coaligned with the amplified light resulting in relatively longer absorption lengths and higher overall efficiencies. The coaligned pumped sources are directed to lateral faces of the slab which include footprints or windows, formed from anti-reflection coatings at the pump wavelength. In order to cause internal reflection of the pump beam along the lapsing axis, the end faces are formed at about a 45° angle relative to the longitudinal axis which causes the pumped light to be reflected within the slab along longitudinal axis. In order to confine the absorption of the pumped light to the center portion of the slab, the slab may be formed from a composite material with the opposing end portions of the slab formed from an undoped host material while the center portion of the slab along the longitudinal axis is formed from a doped host material. Such a configuration provides relatively low residual thermal lensing with virtually no birefringence. In one embodiment, the pump light from the diode arrays is coupled to the slab by way of lenses or lens ducts. In an alternate embodiment, the pump light is coupled to the slab by way of optical fibers. In yet another embodiment, the pump light and laser beams are interchanged forming a low-loss straight through slab with an end pumped architecture.

DESCRIPTION OF THE DRAWINGS

The principles of the present invention may be readily understood with reference to the following specification and attached drawing wherein.

DETAILED DESCRIPTION

The present invention relates to an optical amplifier, generally identified with the reference numeral 20. In accordance with an important aspect of the invention, the optical amplifier 20 utilizes end pumping. With such a configuration, the pumped light is coaligned with the amplified light along a longitudinal axis of the slab resulting in a relatively long absorption length, thus providing relatively higher overall efficiencies. The invention is particularly suitable for optical amplifiers which utilize solid state lapsing material with relatively low absorption coefficients, such as those materials using Yb and Tm dopants. As will be discussed in more detail below, the absorption of the pumped light may be confined to a central region of the slab to reduce heating at the opposing ends of the slab which are known to be susceptible to warping.

Figure 5:
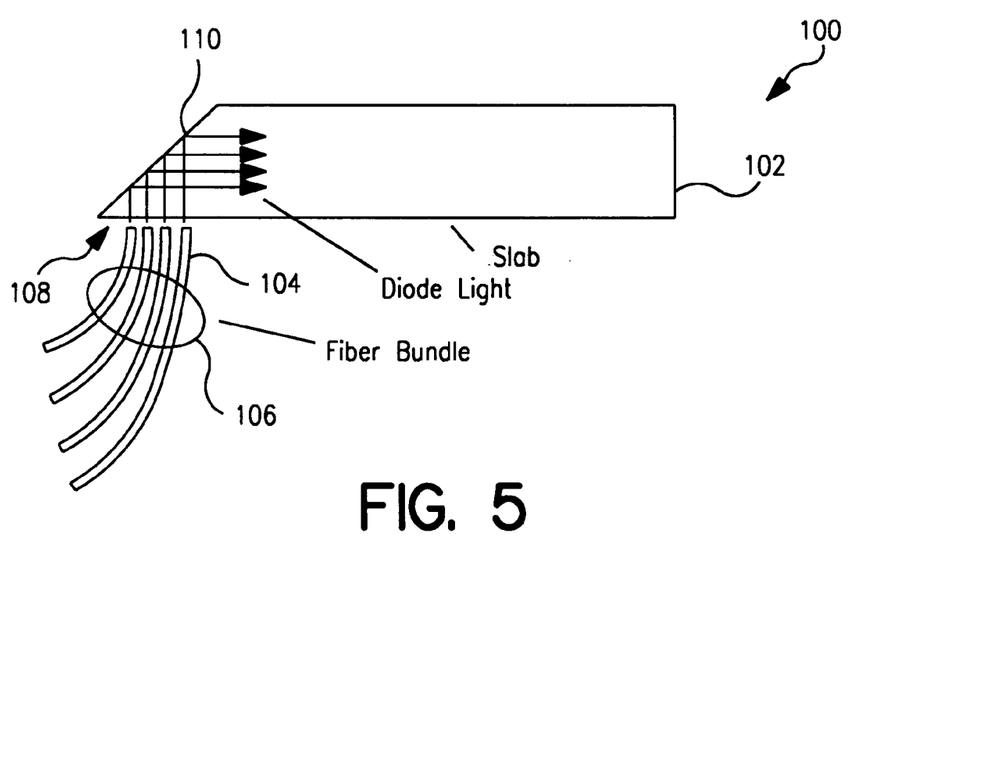
FIG.5 is a plan view of an alternate embodiment of the invention illustrating an end pumped architecture with fiber coupled pump light.
Figure 6:
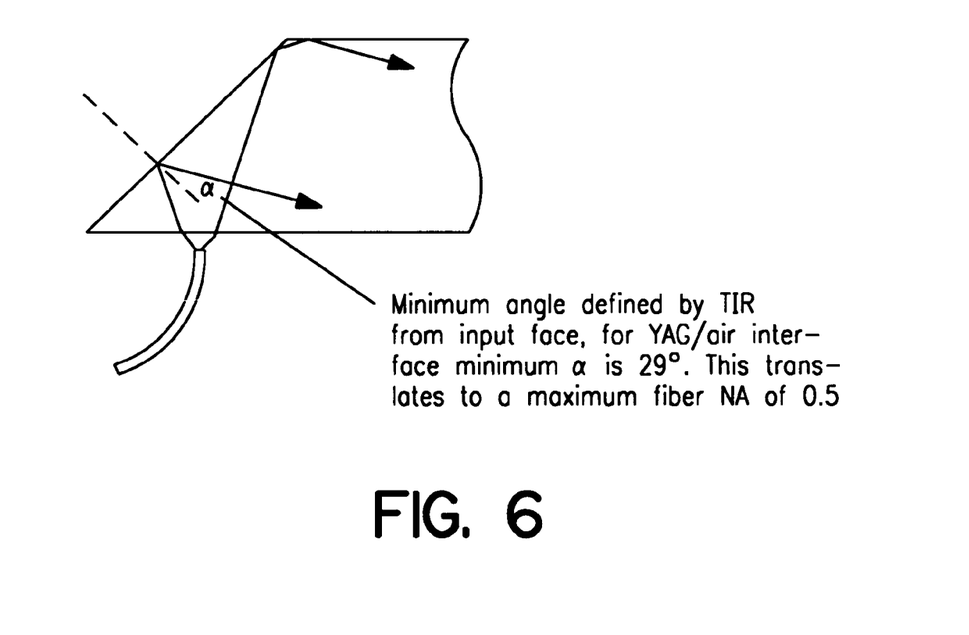
FIG. 6 is a partial plan view of the embodiment illustrated in FIG. 5 illustrating the geometry of the angular acceptance criteria for the fiber coupled end pumped architecture.
Figure 7:
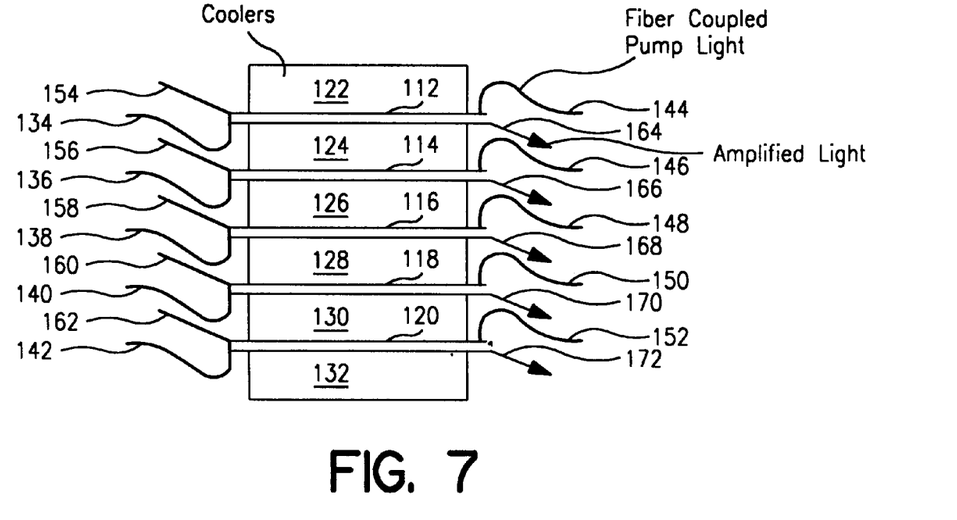
FIG. 7 is an elevational view illustrating a plurality of stacked fiber pumped amplifiers as illustrated in FIG. 5.
Figure 8:
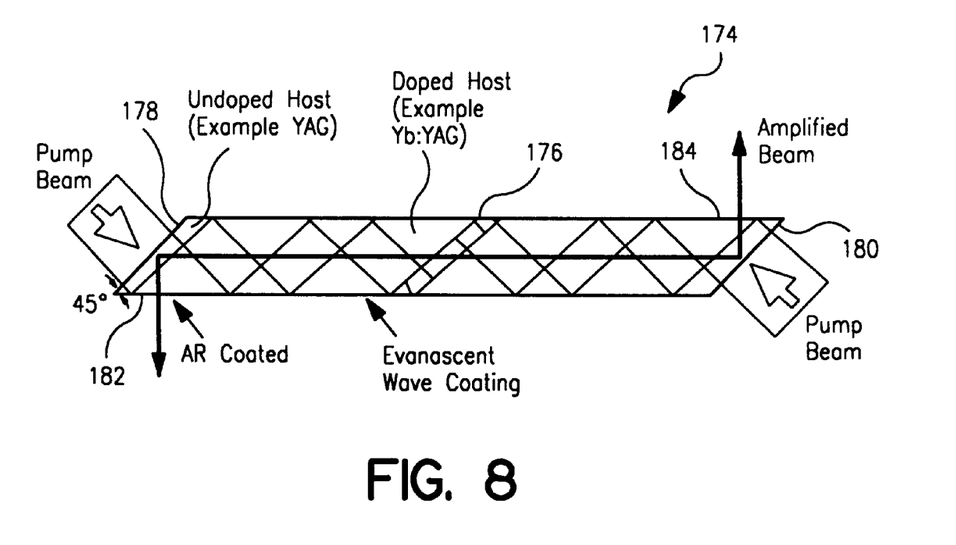
FIG. 8 is a plan view of an another alternate embodiment illustrating a low loss straight through slab with an end pumped architecture.

Various embodiments of the invention are described and illustrated. FIGS. 1–4, as set forth in commonly-owned copending patent application Ser. No. 09/111,080, filed in Jul. 7, 1998, illustrate a first embodiment of an end pumped zig-zag optical amplifier architecture in which the pumping is provided by diode arrays coupled to the slab through lenses or lens ducts. FIGS. 5–7 illustrate an alternate embodiment of the invention in which pumping of the slab is provided by light from a diode array, coupled to the slab by way of optical fibers which allows the slabs to be stacked. FIG. 8 illustrates another alternate embodiment of the invention in which the pump and laser beams are interchanged relative to FIG. 1, forming a low loss straight through optical amplifier.

Figure 1:
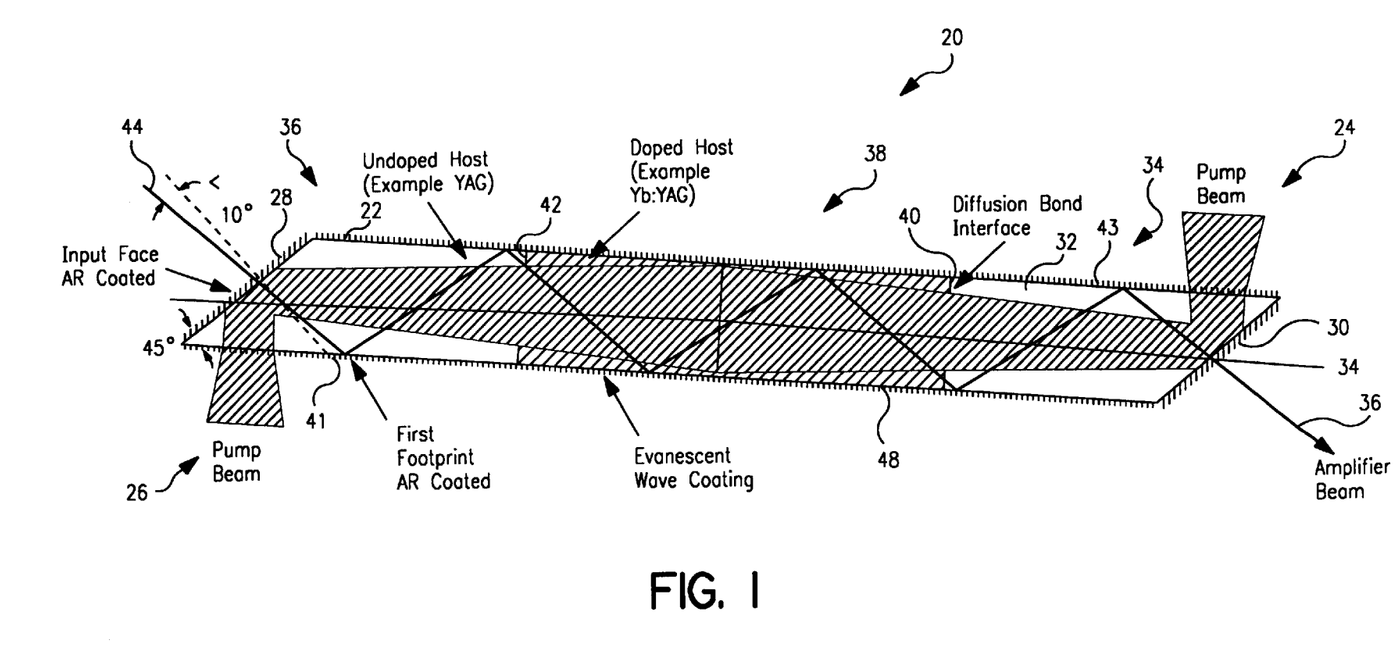
FIG. 1 is a plan view of an optical amplifier in accordance with the present invention.

Referring to FIG. 1, the optical amplifier 20 includes a elongated slab 22 and a pair of pumped beam sources 24 and 26. The elongated slab 22 is formed with a generally rectangular or square cross section defining a pair of opposing end faces 28 and 30 and four lateral faces 32. As used herein, a longitudinal or lapsing axis 34 is defined as an axis generally parallel to the lateral surfaces 32 between the opposing end faces 28 and 30. A major axis is defined as a horizontal axis in the direction of the zig-zag pattern while a minor axis is defined to be a vertical axis generally perpendicular to the major axis. Both the major and minor axes are perpendicular to the longitudinal axis.

The slab 22 may be formed from a solid state lapsing material with a relatively high index of refraction to cause internal reflection of the input beam in a generally zig-zag pattern as illustrated in FIG. 1, forming a so called zig-zag amplifier. Such zig-zag amplifiers are known to allow brightness scaling by allowing the input beam to average thermal gradients in the slab effectively providing a homogeneous gain medium. In order to reduce heating of the ends of the slab 22, the slab 22 may be formed as a diffusion bonded composite material. More particularly, along the longitudinal axis 34 of the slab 22, the opposing end portions 34 and 36 of the slab 22 can be formed from undoped host materials, such as yttrium-aluminum-garnet (YAG). These end portions 34 and 36 can be diffusion bonded to a central portion 38 of the slab 22 formed from a doped host material, such as Yb doped YAG (Yb:YAG) forming two diffusion bond interfaces 40 and 42. Such diffusion bonding techniques are known in the art, for example, as described in detail in U.S. Pat. No. 5,441,803 hereby incorporated by reference. Such a configuration limits the absorption length to the center portion 38 of the slab 22. By limiting the absorption length to the center portion 38 of the slab 22, heat generated by the optical pumping is in the center portion 38 and away from the end portions 34 and 36, which are susceptible to warping. As mentioned above, the pumped light is reflected through the slab 22. As such the pump beams 24 and 26 may enter opposing lateral faces 32 of the slab 22 at opposing end portions 34 and 36, respectively, as generally shown in FIG. 1. In order to enable the light into the slab 22, one or more footprints or windows 41 and 43 may be formed on opposing end portions 34 and 36. The windows 41 and 43 may be formed by way of a coating, such as an antireflection coating selected for the wavelength of the pump beams 24 and 26. As shown in FIG. 1, the antireflection coating is disposed on the lateral face 32 as well as the opposing end faces 28 and 30 and thereby reducing losses of the input beam and pump beam. The pump beams 24 and 26 are directed to opposing lateral faces 32 at opposing end portions 34 and 36 of the slab 32. As shown in FIG. 1, the pump beams 24 and 26 are totally internally reflected from the opposing end face 28 and 30 so that the pump beams are coaligned with the longitudinal axis 34. By utilizing the composite slab 22 as discussed above, the absorption length of the slab 22 is limited to the central portion 28.

An input light beam 44 is directed to one end face 28 at a relatively small angle, for example, less than 30° relative to the normal of the end face. By confining the angle of incidence of the input angle 44 and selecting a material having a relatively high index of refraction, the input light beam 44 is totally reflected along the slab 22 in a generally zig-zag pattern as shown and is out coupled as an amplified beam 46 from the opposing end face 30. The zig-zag pattern across the slab temperature gradients combined with uniform pumping by the guided diode light and insulated slab edge results in relatively low thermal lensing with virtually no birefringence.

It is known in the art that pumping of the slab 22 results in increased temperature in the area where the pump light is absorbed. As mentioned above, pump beams, for example, from diode arrays, are directed generally perpendicular to the end faces 32 through the windows or footprints 41 and 43 and reflected from the opposing end faces 28 and 30 to cause the pump beam to be directed along the longitudinal axis 34. In order to cool the slab 22, various cooling methods can be used. Both conduction and convection cooling systems are suitable. An example of a conduction cooling system is to attach the slab 22 to a high intensity impingement cooler, for example, as manufactured by Thermo-Electron in San Diego, Calif. or SDL, Inc. in San Jose Calif.

Figure 3:
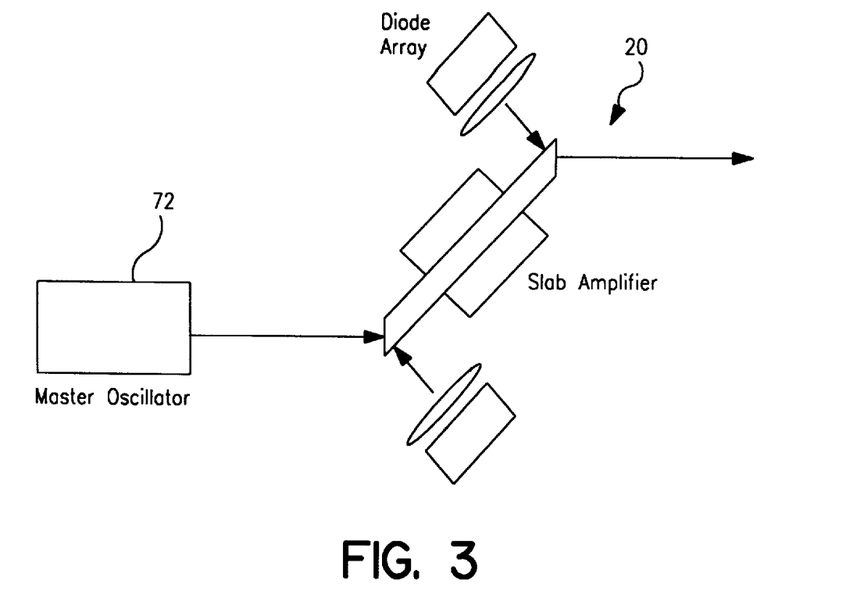
FIG. 3 is a schematic diagram of the end pumped optical amplifier in accordance with the present invention in a resonator configuration.
Figure 4:
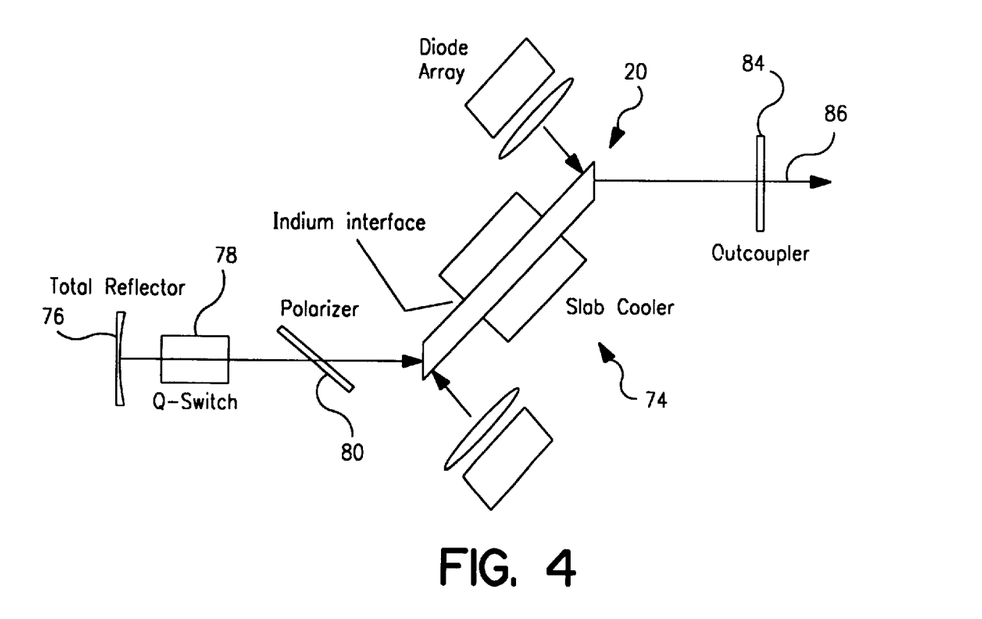
FIG. 4 is similar to FIG. 3 where the optical amplifier in accordance with the present invention is used a master oscillator power amplifier (MOPA) configuration.

To minimize the thermal resistance between the slab 22 and the coolers, a thin layer of a thermally conductive material such as a soft metal, such as indium or gold as generally illustrated in FIGS. 3 and 4, may be used. During assembly, the cooler/indium/slab assembly may be held under pressure at elevated temperatures, approximately 150° C. to flow the indium and eliminate contact resistance. For direct or convective cooling, the slab 22 may be sealed in the dead zones with a thin layer of turbulent coolant flowing over the slab faces to remove heat as discussed in detail in U.S. Pat. No. 5,646,773, hereby incorporated by reference. An exemplary convection cooling system is disclosed for example, in commonly owned U.S. Pat. No. 5,646,773, hereby incorporated by reference.

In the case of conduction cooling, the lateral faces 32 of the slab 22 are coated with a dielectric material which serves as an evanescent wave coating 48 to preserve total internal reflection. As shown in FIG. 1, the evanescent wave coating 48 may extend from one end face 28, 30 to a region slightly beyond the diffusion bond interface 42, adjacent to the opposing end face. The evanescent wave coating 48 allows the slab 22 to be directly adhered to the impingement cooler. A thick layer (2–4 $\mu$m) of $MgF_2$ or $SiO_2$ may be used as the evanescent wave coating 48.

Figure 2:
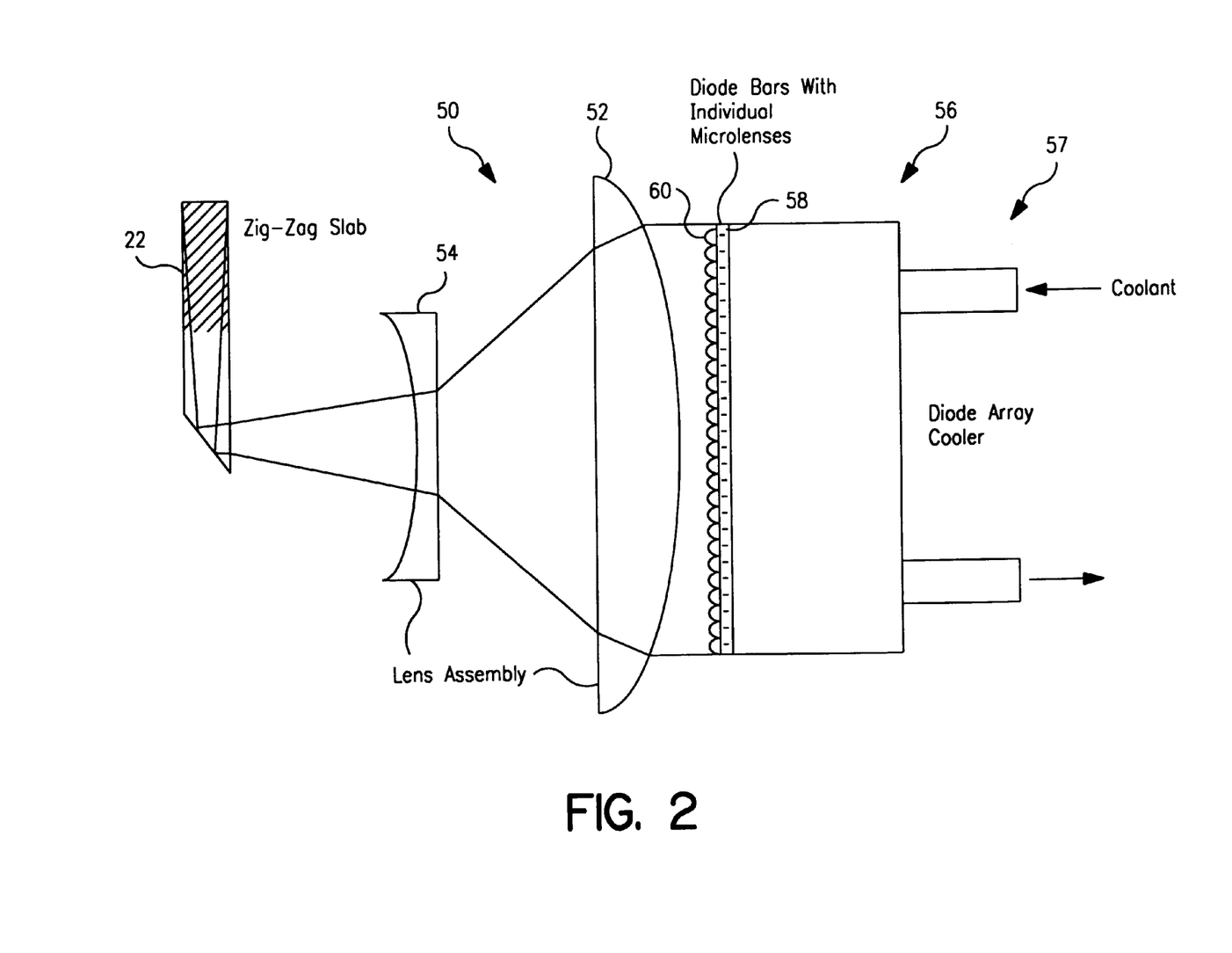
FIG. 2 is a diagram of an anamorphic lens assembly and diode array for use with the present invention.

High power diode arrays 56, for example, with a diode array cooler 57, may be used to generate the pump beams 24 and 26. Efficient pumping of the slab 22 may be achieved by using a suitable anamorphic lens assembly 50 as generally illustrated in FIG. 2. The anamorphic lens assembly includes a pair of lenses 52 and 54, disposed between a diode array 56 and the windows 41 and 43 on the slab 22. The diode arrays 56 may include a plurality of stacked diode bars 58 with individual microlenses 60. The microlenses 60 reduce the divergence of the fast axis of the bars 58 to approximately 1° while the slow axis may have a full angle divergence on the order of 7°. By using the anamorphic lens assembly 50, the output of the diode array 56 can be imaged onto the input area on the windows 41 and 43 of the slab 22 such that a 2×1 cm diode array may be imaged on an area as small as 2×2 mm.

Alternatively, a lens duct may be used in place of the anamorphic lens assembly 50. A suitable lens duct is disclosed in U.S. Pat. No. 5,307,430, hereby incorporated by reference.

The optical amplifier 20 in accordance with the present invention may be used to form a master oscillator power amplifier (MOPA). In this embodiment as illustrated in FIG. 3, a master oscillator 72 is directed to an input end face 28 of the slab 22. The master oscillator may be, for example, as discussed and illustrated with respect to FIG. 4 below. As discussed above, the input beam to the end face must be at an angle suitable to provide total internal reflection from the lateral sides of the slab.

As illustrated in FIG. 4, the optical amplifier 20 may be used to form a master oscillator 74. In this embodiment, the beam oscillates between total reflector 76 and outcoupler 84 which partially transmits to provide the output beam. A Q-switch 78 may be included in the cavity.

An alternate embodiment is illustrated in FIG. 5 and generally identified with the reference numeral 100. This embodiment is essentially the same as the embodiment illustrated in FIG. 1 with the exception that the pump light is coupled to the slab 102 by one or more optical fibers 104 forming a fiber bundle 106. Only a portion of the slab 102 is shown for brevity. Similar to the embodiment illustrated in FIG. 1, the slab 102 may be formed from a solid state lapsing material with a relatively high index of refraction to cause internal reflection of the input beam in a generally zig-zag pattern as illustrated in FIG. 1. In order to reduce heating of the ends of the slabs 102, both end portions of the slab 102 may be formed from an undoped host material, such as yttrium-aluminum-garnet (YAG), and diffusion bonded to the central portion of the slab 102, formed from a doped host material such as Yd doped YAG (Yd: YAG) forming diffusion bond interfaces as discussed above.

Similar to the embodiment illustrated in FIG. 1, windows may be formed on the opposing end portions to enable the light into the slab. Only one end portion is shown for brevity. As discussed above, the windows may be formed by a way of a coating, such as an antireflection coating, selected for the wavelength of the pump beams. The pump light from the fiber bundle 106 (FIG. 5) is directed to a window in an end portion 108. As shown in FIG. 5, the pump light is totally reflected from an end face 110 so that the pump light is coaligned with a longitudinal axis of the slab 102. As shown in FIG. 6, the minimum angle a for total internal reflection within the slab 102 for a YAG-air interface for a material, such as Nd: YAG or Yb: YAG (index refraction of 1.82), is ±30°. This minimum angle a is based on a total internal reflection angle from a 45° end face 110 as generally shown in FIG. 6. This translates to a maximum fiber numerical aperture (NA) of 0.5 which represents a relatively large NA for typical fibers used for delivering high-power light from diodes.

The pump light may be generated by diode arrays as discussed above. The diode light may be coupled to the fibers with appropriate optics, such as systems available from Coherent Inc., Spectra Physics Inc., and SDL Inc.

An important aspect of the architecture illustrated in FIG. 5 is that it enables multiple slabs to be stacked as illustrated in FIG. 7. In particular, the configuration illustrated in FIG. 5 enables the diode arrays for the pump light to be located remotely relative to the slabs. As such, this enables multiple slabs to be stacked as illustrated in FIG. 7 to form a high power amplifier array. The fibers provide access to the slab pump windows, normally not accessible by way of lenses or lens ducts when the slabs are stacked as shown.

In particular, a plurality of slabs 112, 114, 116, 118 and 120 may be stacked. The slabs 112, 114, 116, 118 and 120 may be sandwiched between coolers 122, 124, 126, 128 and 130. The coolers are as discussed above. As shown, the slabs 112, 114, 116, 118 and 120 are sized to be slightly longer than the coolers 122, 124, 126, 128, 130 and 132 so that the opposing end portions of each of the slabs 122, 124, 126, 128, 130 and 132 extend outwardly therefrom. Such a configuration enables the pump light to be directed to the windows in the slabs by way of a plurality of optical fibers 134-152 as generally shown in FIG. 7.

As discussed above, the configuration illustrated in FIG. 7 forms a high power amplifier array. The input laser beams are represented by the arrows 154, 156, 158, 160 and 162. The output light beams are represented by the arrows 164, 166, 168, 170 and 172.

Another alternate embodiment is illustrated in FIG. 8 and identified with the reference numeral 174. The amplifier 174 includes a slab 176 and is essentially the same as the amplifier 20 illustrated in FIG. 1 with the exception that the pump and laser beams are interchanged. In particular, the slab 176 includes opposing end faces 178 and 180 and windows 182 and 184. In this embodiment, the pump light is directed to the opposing end faces 178 and 180 and is totally reflected within the slab 176 in a zig-zag pattern, as shown, which provides relatively homogeneous pumping of the slab 176. In this embodiment, the laser beam is directed into the windows 182, 184 and reflected from the opposing end faces 178, 180 straight through the slab 176. The configuration illustrated in FIG. 8 is usefully in applications where the required power requirements are not high but low loss is required. The pump light may be coupled to the slab 176 through lenses, lens ducts or fiber bundles as discussed above.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. An optical amplifier comprising:
   an elongated slab of a solid state lapsing material defining a longitudinal axis having opposing end faces and a plurality of lateral surfaces, said lateral surfaces being generally parallel to said longitudinal axis of said slab, said end faces cut at an angle with respect to a normal axis to the said longitudinal axis;
   a pump light source; and
   one or more optical fibers for optically cowling said pump light source to said slab.

2. The optical amplifier recited in claim 1, wherein said slab is a composite slab formed from two or more materials forming a central absorbing section sandwiched between two nonabsorbing sections.

3. The optical amplifier as recited in claim 2, wherein said two or more sections are diffusion bonded together defining one or more diffusion bond interfaces.

4. The optical amplifier as recited in claim 2, wherein said nonabsorbing sections are formed from an undoped solid state lapsing material.

5. The optical amplifier as recited in claim 4, wherein said undoped solid state lapsing material is yttrium-aluminum-garnet (YAG).

6. The optical amplifier as recited in claim 2, wherein said absorbing section is formed from a doped solid state lapsing material.

7. The optical amplifier as recited in claim 6, wherein said doped solid state lapsing material is Yb doped YAG.

8. The optical amplifier as recited in claim 1, including an antireflective coating applied to a portion of said lateral surfaces defining windows.

9. The optical amplifier as recited in claim 8, wherein said antireflective coating is selected for the wavelength of the pump beam.

10. An optical amplifier for receiving an input light source and transmitting amplified light, comprising:
    an elongated slab of a solid state lapsing material defining a longitudinal axis having opposing end faces and a plurality of lateral surfaces, said lateral surfaces being generally parallel to said longitudinal axis of said slab, said end faces cut at an angle with respect to a normal axis to the said longitudinal axis;
    a coating applied to said lateral surfaces defining windows for receiving said input light source and transmitting said amplified light; and
    one or more optical fibers for optically coupling said pump light source to said end faces in said slab.

11. The optical amplifier as recited in claim 10, wherein said coating is an antireflective coating.

12. The optical amplifier as recited in claim 11, wherein said antireflective coating is selected for the wavelength of the input light.

13. An optical amplifier array comprising:
    a plurality of stacked elongated slabs of solid state lapsing materials having opposing end faces and a plurality of lateral surfaces, said end faces cut at an angle relative to the plane of a said slab;
    a plurality of pump light sources; and
    a plurality of optical fibers for optically coupling said plurality of pump light sources to said plurality of slabs.

* * * * *